Aug. 27, 1935.  E. L. KRAFT  2,012,764
VENTILATOR
Filed March 2, 1933    3 Sheets-Sheet 1
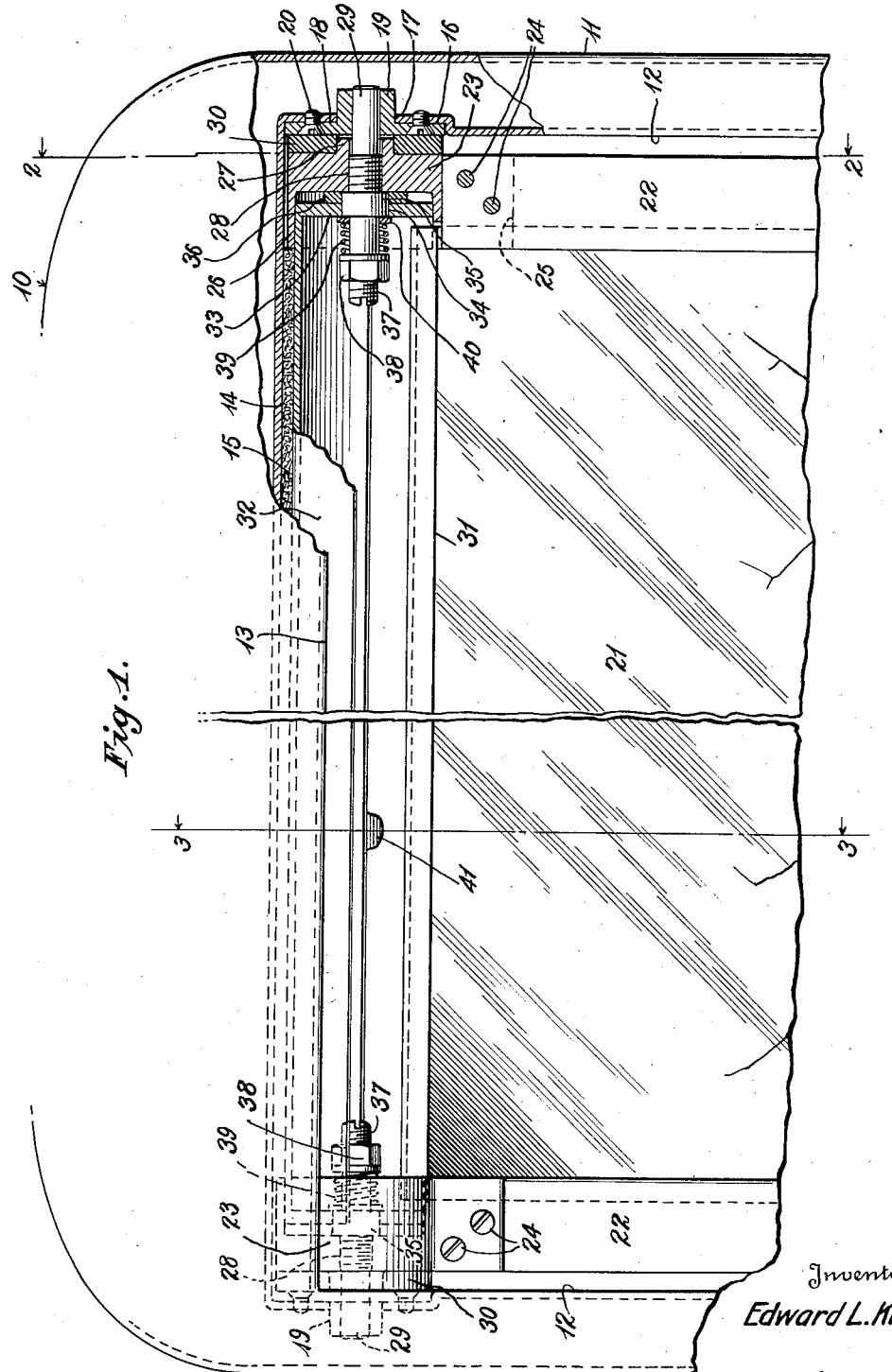
Inventor
Edward L. Kraft
By Bacon & Thomas
Attorneys

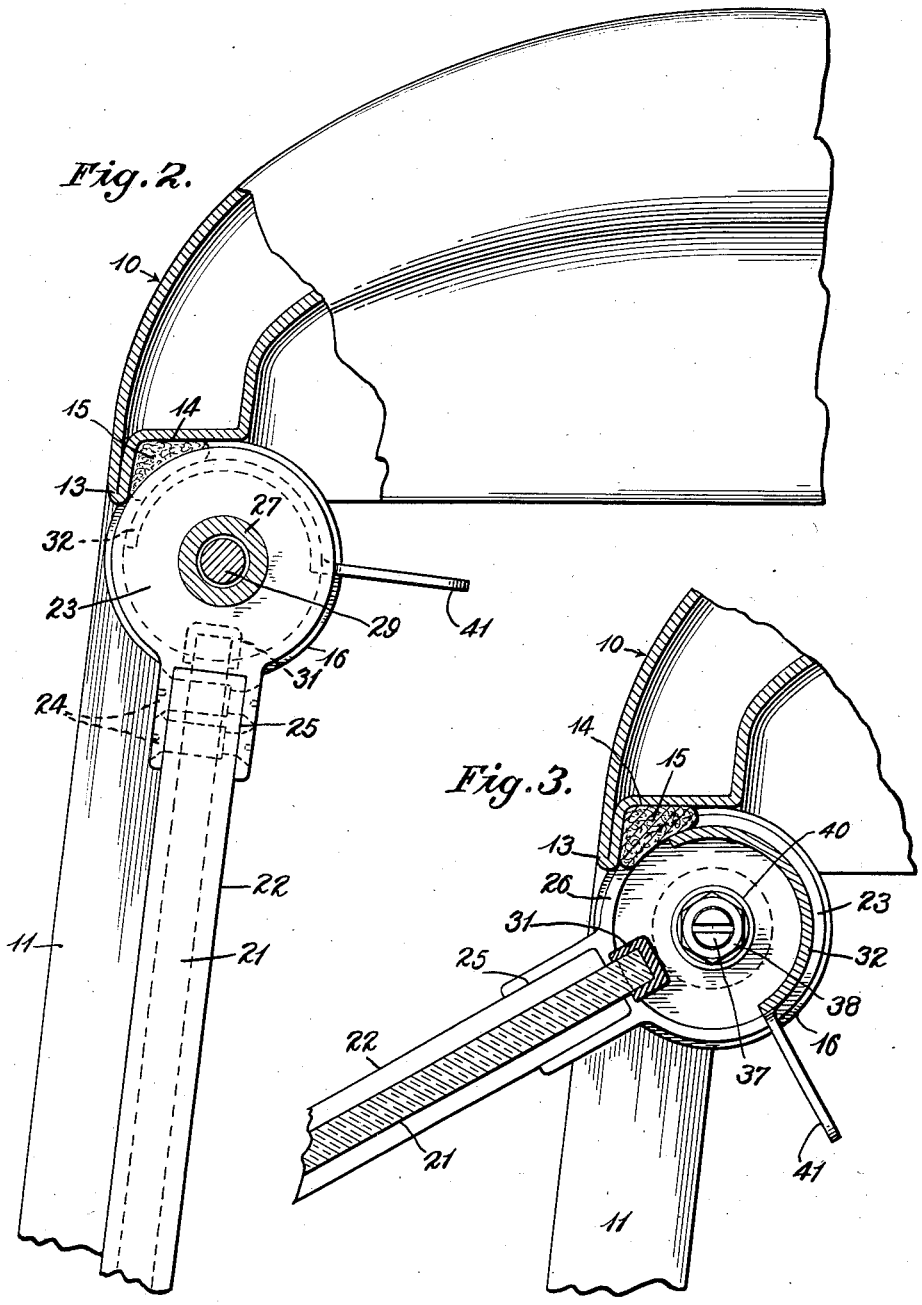

Aug. 27, 1935.    E. L. KRAFT    2,012,764
VENTILATOR
Filed March 2, 1933    3 Sheets-Sheet 3
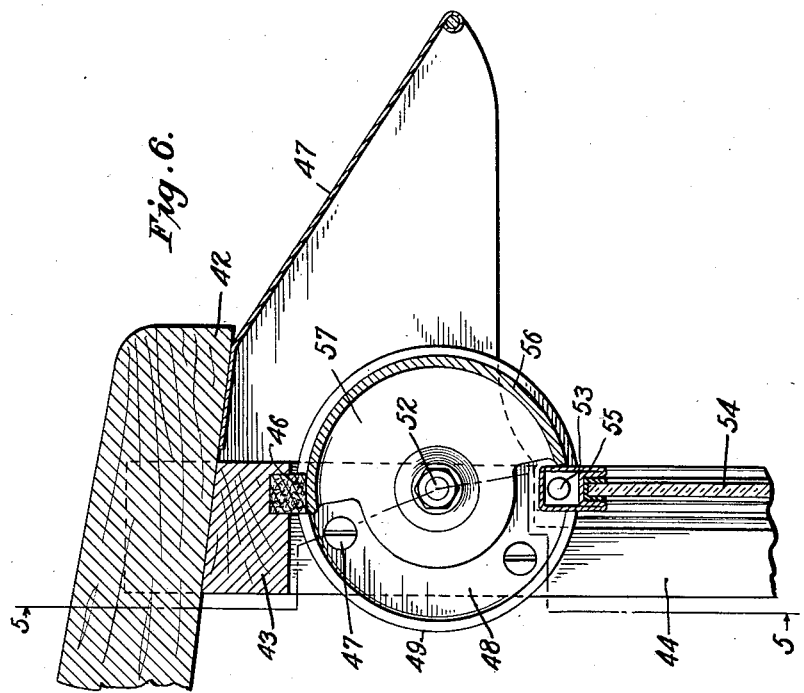
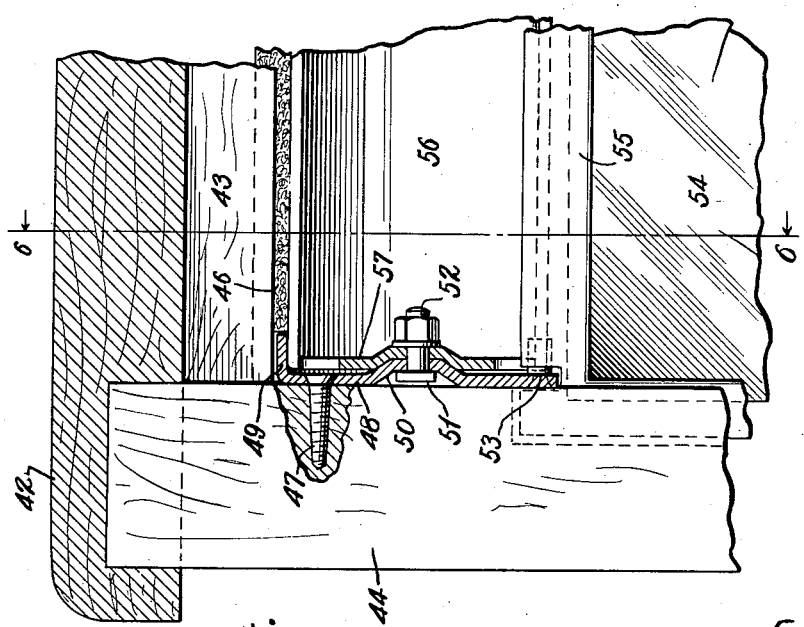
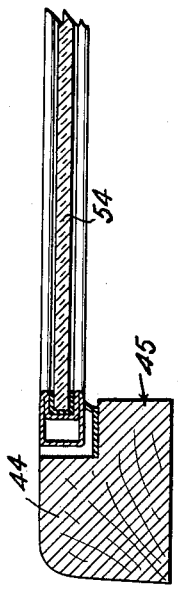
Inventor
Edward L. Kraft
By Bacon & Thomas
Attorneys Patented Aug. 27, 1935

2,012,764

UNITED STATES PATENT OFFICE 2,012,764

VENTILATOR

Edward L. Kraft, York, Pa., assignor to Martin-Parry Corporation, York, Pa., a corporation of Delaware Application March 2, 1933, Serial No. 659,384

8 Claims. (Cl. 296—84)

This invention relates to new and useful improvements in ventilators for closed automobile bodies.

The primary object of the invention is to provide ventilating means for motor vehicle bodies wherein a plurality of pivotally mounted ventilator members are employed for collectively controlling the passage of air through an opening in a wall of a body.

A further object of the invention is to provide novel means for mounting two pivoted ventilator members in an opening formed in a wall of a vehicle body and wherein the novel mounting means are common to both of said members.

A specific object of the invention is to provide two ventilator members for controlling the passage of air through the conventional windshield opening of a motor vehicle, one of said members acting as the windshield, while the second member functions as an auxiliary ventilator element.

Other objects and advantages of the invention will be apparent during the course of the following description:—

In the accompanying drawings forming a part of this specification and in which like numerals are employed to designate like parts throughout the same, Figure 1 is a front elevational view, partly broken away, of one form of the invention;

Figure 2 is a vertical sectional view taken on line 2—2 of Fig. 1;

Figure 3 is a vertical sectional view taken on line 3—3 of Fig. 1;

Figure 4 is a detailed perspective view of one mounting element for the structure disclosed in Figs. 1 to 3 inclusive;

Figure 5 is a partly elevational view and partly vertical sectional view of a modified form of ventilator mechanism taken on line 5—5 of Fig. 6;

Figure 6 is a vertical sectional view taken on line 6—6 of Fig. 5; and

Figure 7 is a horizontal sectional view of the windshield and a corner post structure shown in Figs. 5 and 6.

In the drawings, wherein for the purpose of illustration are shown two preferred embodiments of this invention, the numeral 10, in Figs. 1 to 3 inclusive, designates the roof of a closed body for a motor vehicle. Depending from the roof are pillars or corner posts 11 which define an opening 12. While this opening 12 is disclosed as a conventional front or windshield opening for a vehicle, it is to be understood that the invention is not limited to that particular opening, but may constitute any of the conventional openings in the side or rear walls of a vehicle body.

In Figs. 1 to 3 inclusive the roof 10 is illustrated as being formed of hollow construction and as having a finishing flange or bead 13 extending transversely of the roof and as depending therefrom. This flange or bead 13 cooperates with the main edge or margin of the roof to form a channel 14 for receiving a sealing or packing strip 15 which cooperates with one of the ventilator members in a manner to be described at a later point for sealing between the ventilator member and the edge of the roof.

In Fig. 1 the opposite corner posts or pillars are illustrated as having formed in the inner surfaces thereof pockets or depressions 16 having central apertures 17. These pockets and apertures are designed to receive bracket or bearing members which include end plate portions 18 and bearing projections 19. Screws, or the like, 20, are employed for fastening the mounting brackets in the said depressions or pockets 16.

A glass windshield 21 is employed for controlling the passage of air through the major portion of the opening 12. This windshield 12 includes side frame members 22 which are of conventional channel form for receiving the adjacent edges of the windshield glass panel. To the upper end of each side frame member 22, a cup-like bracket 23 is secured by means of screws or the like 24, which pass through the windshield frame 22 and an integral projection 26. Each cup-like bracket 24 is provided with a substantially annular flange portion 26 formed on its margin and projecting away from the pillar or corner post 12. Projecting axially from the opposite side of the body of the bracket 23 is an annular hub portion 27. An internally threaded aperture 28 is formed in each bracket 23 and is designed to be threadedly connected to a pivot pin 29. It will be understood that the elements 23 to 29 inclusive are duplicated at each side of the opening 12 and that the outer extremities of the pivot pins are rotatably received within the bearing portions 19 of the mounting brackets 18. For the purpose of maintaining the brackets 23 spaced from the brackets 18, a friction packing member or ring 30 is interposed between the same. This packing member or ring 30 surrounds the hub 27 of the bracket 23.

It will be noted that the glass panel of the windshield 21 terminates in spaced relation with respect to the roof 10 and has its free edge provided with a sealing strip 31. This space left between the free edge of the windshield glass and the roof is intended to receive a second or auxiliary ventilator member 32 which, preferably, is of arcuate formation and has its two longitudinal edges extending in a plane which intersects the axis of rotation of this ventilator member. At each end, the ventilator 32 is provided with an inturned flange or end plate 33 which may be formed integrally with the body of the ventilator 32, or may be formed separately therefrom. The end plate 33 is centrally apertured at 34 to receive an enlarged bearing portion 35 of the pivot pin 29. The auxiliary ventilator member 32 is intended to freely pivot on the bearing portion 35 of the said pin. A packing or friction member 36 is interposed between the end plate or flange 33 of the ventilator 32 and the bracket 23 for the windshield 21.

Each pin 29 is provided with a threaded end portion 37 for receiving a nut and washer 38. A spring 39 is interposed between the nut and washer and the enlarged bearing portion 34 of the pin 29. For the purpose of preventing the spring from bearing directly on the bearing portion 34, a washer 40 is interposed between the same. The threaded end 37 of the pivot pin 29 is transversely slotted for the purpose of receiving a screwdriver, or the like, by means of which the pin is rotated with respect to the bracket 23 of the windshield to permit the pin to be connected to or separated from said bracket. It is to be understood that the elements 34 to 40 are duplicated at each side of the windshield and it will be noted that the pivot pins 29 function as common supports for both of the ventilator members 21 and 32.

An operating grip 41 is secured to one edge portion of the ventilator 32 and is employed for actuating this ventilator. It is to be understood that any other form of actuating means may be employed for moving the ventilator 32.

It will be seen that with this form of mounting, the windshield 21 may be adjusted outwardly and upwardly for opening the same. Due to the fact that the pivot pins 29 are threadedly connected to the windshield, the auxiliary ventilator 32 will maintain its adjusted relation with respect to the windshield. If desired, however, the ventilator member 32 may be adjusted with respect to the windshield regardless of the position the windshield occupies. It further will be noted that the auxiliary ventilator 32 may be moved into two closed positions located on opposite sides of the windshield 21 and with one of its longitudinal edges contacting with the sealing strip 31 carried by the free edge of the windshield. The auxiliary ventilator member 32 also may be arranged in any intermediate opened position between the aforementioned two closed positions. With the auxiliary ventilator 32 in either one of its closed positions, a longitudinal edge of the same will engage the sealing strip 31, carried by the windshield glass panel 21, for sealing between the two ventilator members. The sealing or packing strip 15, carried by the roof 10, will seal the space between the auxiliary ventilator 32 and the roof by having a wiping engagement with the outer face of the ventilator member 32. The two ventilator members, therefore, will cooperate to very effectively control the passage of air through the opening 12.

In Figs. 5 to 7 inclusive there is disclosed a modified form of the invention. It will be noted, as the description of this second form proceeds, that the two embodiments of the invention have many features in common which are, namely, the provision of a common mounting bracket at each side of the opening which functions to pivotally support both of the ventilator members with the common mounting brackets secured to the corner posts or pillars and with the two ventilator members cooperating to control the passage of air through a single opening formed in a wall of the vehicle body. Furthermore, the two ventilator members may be adjusted separately so that one may be opened while the other is closed, or so that both may be opened at the same time.

While this second embodiment of the invention is illustrated as being employed for controlling the windshield opening of a body, it is to be understood, as described in connection with the construction shown in Figs. 1 to 4 inclusive, that this embodiment of the invention may be associated with any other opening in a car body. In Figs. 5 to 7 inclusive, the reference numeral 42 is employed to designate the roof of the vehicle. A header strip 43 is secured to the roof and at its opposite ends contacts with corner posts or pillars 44. The header 43 and the corner posts 44 cooperate to form an opening 45. The header has secured thereto to extend longitudinally thereof a sealing or packing strip 46 which cooperates with one of the ventilator members in a manner to be described at a later point. A visor 47 is secured to the roof 42 and the corner posts or pillars in any desired manner.

Each corner post or pillar 44 has secured thereto, by means of screws or the like 47, a mounting bracket 48. The major portion of the periphery of this bracket 48 is formed with an annular flange 49 which extends axially inwardly from the main body of the bracket. This bracket 48 is dished centrally, or at 50, for receiving the head 51 of a pivot pin 52 which passes through an axial opening in the dished portion 50. Adjacent the lower peripheral portion, the bracket 48 has connected thereto a pivot pin 53. It is to be understood that a bracket 48 with two pivot pins 52 and 53 is positioned at each side of the opening 45 and they are connected to the opposite corner posts or pillars 44.

A windshield 54 is provided with a marginal frame 55. The upper portion of this frame 55 is pivotally connected to the opposite pivot pins 53 so that the windshield may be pivoted with respect to the opposite mounting brackets 48. A trough-shaped ventilator member 56 is positioned within the opening 45 to cooperate with the header 43 and the windshield 54 for closing the portion of the opening not controlled or bridged by the windshield 54. This trough-shaped ventilator 56 is provided with end plates 57 which are centrally apertured and adapted to receive the pivot pins 52 for pivotally connecting the opposite ends of the ventilator 56 to the opposite mounting brackets 48. Any suitable operating means may be employed for adjusting the trough-shaped ventilator 56. It will be understood that this ventilator may assume two closed positions, as described in connection with the ventilator 32 of the preceding form of the invention. The ventilator body 56 cooperates with the sealing strip 46 so that there will be no leakage of rain, snow, or the like, between the ventilator body 56 and the header 43. When in either one of its closed positions, one edge of the ventilator body 56 will contact with the top frame member 55 of the windshield 54 for preventing leakage between the two ventilator members.

It is to be understood that the forms of this invention herewith shown and described are to be taken as preferred examples of the same and that various changes in the shape, size and arrangement of parts may be resorted to without departing from the spirit of the invention or the scope of the subjoined claims.

Having thus described the invention, I claim:—

1. The combination with a closed vehicle body having a single ventilating opening formed in a wall thereof, of two pivoted ventilator members both extending the full width of said opening cooperatively associated to entirely close said opening or to open different portions of the same, and pivot means common to both of said members for pivotally connecting them to said body to cause them to pivot about a common axis.

2. The combination with a closed vehicle body having a single ventilating opening formed in a wall thereof, of two pivoted ventilator members both extending the full width of said opening cooperatively associated to entirely close said opening or to open different portions of the same, a mounting bracket fastened to each one of opposite marginal parts of said opening, and means for pivotally connecting both of said members to each mounting bracket to cause them to pivot about a common axis.

3. The combination with a closed vehicle body having a single ventilating opening formed in a wall thereof, of two pivoted ventilator members both extending the full width of said opening cooperatively associated to entirely close said opening or to open different portions of the same, and a pivot pin supported one on each of the opposite marginal parts of said opening and pivotally supporting both of said members.

4. The combination with a closed vehicle body having a single windshield opening, of a windshield panel for closing or opening a portion only of said opening, a ventilator for closing or opening the remainder of said opening, and means common to both the windshield panel and ventilator for pivotally connecting them to the part of the body which forms the margin of said opening.

5. The combination with a closed vehicle body having a single windshield opening, of a windshield panel for closing or opening a portion only of said opening, a ventilator for closing or opening the remainder of said opening, a mounting bracket fastened to each one of opposite marginal parts of said opening, and means common to both for pivotally connecting the windshield panel and the ventilator to each mounting bracket.

6. The combination with a closed vehicle body having a single windshield opening, of a windshield panel for closing or opening a portion only of said opening, a ventilator for closing or opening the remainder of said opening, and pivot means supported one on each of opposite marginal parts of said opening and pivotally supporting the windshield panel and the ventilator.

7. The combination with a closed vehicle body having a single windshield opening, of a windshield panel for closing or opening a portion only of said opening, a ventilator for closing or opening the remainder of said opening, a mounting bracket fastened to each one of opposite marginal parts of said opening, and pivot pins connected to said mounting brackets and common to both for pivotally supporting both the windshield and the ventilator on said mounting brackets.

8. The combination with a closed vehicle body having a single ventilating opening formed in a wall thereof, of two ventilator members both extending the full width of said opening cooperatively associated to entirely close said opening, a mounting bracket fastened to each one of opposite marginal parts of said opening, and pivot means common to both of said ventilator members for pivotally connecting the same to each mounting bracket to cause them to pivot about a common axis.

EDWARD L. KRAFT.